Figure 1:
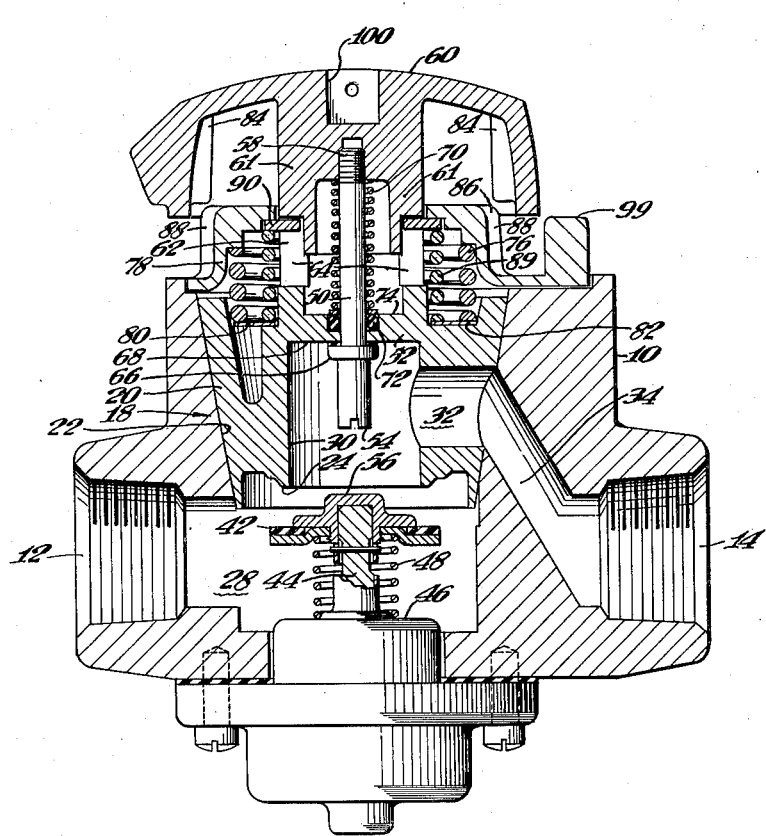

United States Patent Office 3,002,519
Patented Oct. 3, 1961

3,002,519
SAFETY CONTROL FOR GASEOUS FUEL BURNERS
John W. Wright, Long Beach, Wilbur F. Jackson, Compton, and Marvin M. Graham, Rolling Hills, Calif., assignors to Robertshaw-Fulton Controls Company, Richmond, Va., a corporation of Delaware
Filed June 13, 1958, Ser. No. 741,899
6 Claims. (Cl. 137—66)

This invention relates generally to safety controls for gaseous fuel burners and more particularly to combination gas cock and thermoelectric safety shut-off devices for controlling gaseous fuel burners.

In controlling the flow of fuel to gas burners, it is common to employ a thermoelectric safety shut-off valve having an armature and an electromagnet arranged so that when the armature is held in its attracted position, the valve will be maintained in an "open" position permitting flow to the burner and when the armature is released, the valve will be actuated to a "closed" position preventing flow to the burner. In shut-off valves of this type, the electromotive force for holding the armature in its attracted position is usually generated by the heat of a pilot flame acting on a thermoelectric generator. As this electromotive force is generally only enough to hold the armature in its attracted position but is insufficient for attracting the armature from the released position, means are provided for resetting the armature to its attracted position, thereby opening the valve.

In order to prevent the escape of unburned fuel from the main burner during the resetting operation, it is essential that the flow of fuel to the main burner be prevented during such operation until the pilot is lighted. In this manner there will be no danger of explosion of accumulated fuel when a flame is applied to light the pilot.

It is an object of this invention to insure safe lighting of a burner of the indicated type.

Another object of this invention is to prevent the resetting of the safety shut-off valve to the "open" position thereof unless the gas cock is in a position preventing flow to the main burner.

Another object of this invention is to utilize the gas cock in a device of the indicated type as a valve seat for a safety shut-off valve seat.

Another object of this invention is to mount the resetting means for the safety magnet of a device of the indicated type on the means for setting the gas cock in its flow control positions.

Another object of this invention is to utilize the gas cock dial as an actuating means for the reset member of the thermoelectric safety valve.

Another object of this invention is to construct the resetting means and gas cock of a device of the indicated type as a removable unit positioned in alignment with the valve member of the safety shut-off valve.

In a preferred embodiment of the invention, the safety control includes a control valve movable between "off," "pilot," and "on" positions for controlling the flow of fuel to the burner and a thermoelectric safety valve operable between an "open" position permitting flow to the burner and a "closed" position preventing flow to the burner. A control means is provided for moving the control valve between the controlling positions thereof and includes a reset member for resetting the thermoelectric safety valve in the "open" position after the thermoelectric safety valve has been closed upon pilot outage. An interlock means is provided for preventing the resetting operation of the reset member when the control valve is in the "on" position, thereby insuring safe lighting of the burner.

Figure 2:
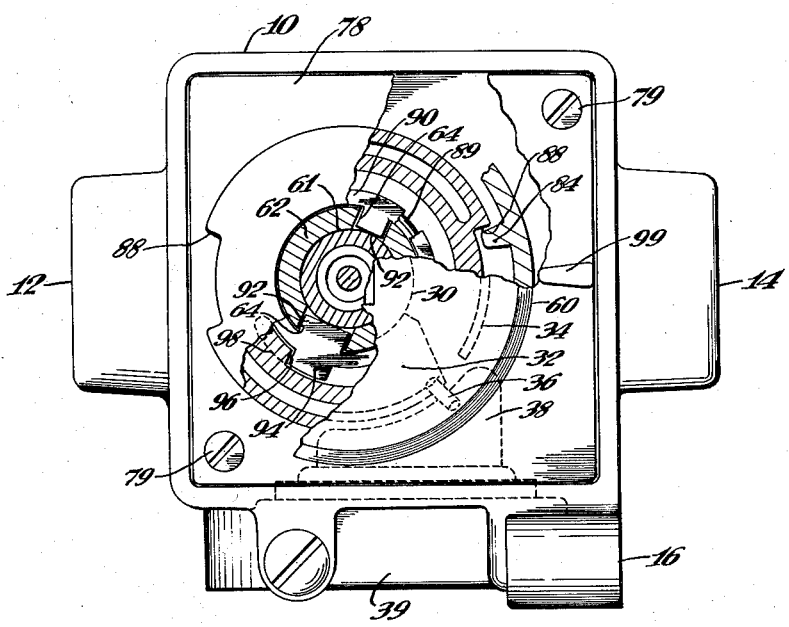
Figure 3:
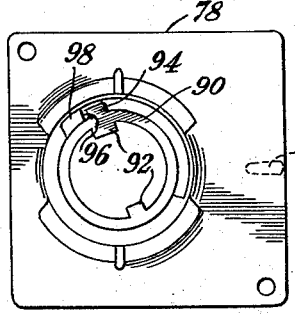
Figure 4:
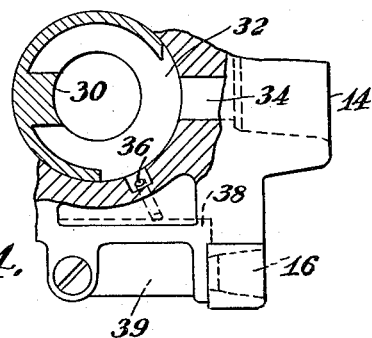

The above and other objects and features of the invention will appear more fully hereinafter from a consideration of the following description taken in connection with the accompanying drawings wherein:

FIG. 1 is a cross-section of a preferred embodiment of the invention;
FIG. 2 is a cut-away fragmentary plan view of a detail of FIG. 1;
FIG. 3 is a reduced plan view of the cover in FIG. 2 inverted to show the underside; and
FIG. 4 is a fragmentary section taken on a longitudinal line through the outlet passage showing its angularity with the pilot passage.

Referring now to the drawings, the safety control valve illustrated therein comprises a casing 10 having an inlet 12 adapted to be connected to a source of fuel, a main outlet 14 adapted to be connected to the main burner of a gaseous fuel burning appliance, and a pilot outlet 16 adapted to be connected to the pilot burner of such fuel burning appliance.

A control valve 18 is interposed between inlet 12 and outlets 14 and 16 and serves to control the flow of fuel from the source to the fuel burning appliance. Control valve 18 is in the form of a truncated conical plug 20 rotatably sealed in a corresponding conical bore 22 in casing 10 between inlet 12 and outlets 14 and 16. A valve seat 24 is formed on the truncated end of plug 20 for communication with an inlet chamber 28 formed in casing 10 in communication with inlet 12. An axially extending central passageway 30 is formed in plug 20 to communicate with valve seat 24.

Plug 20 has a laterally extending passageway 32 communicating with passageway 30 and adapted to register with a main burner passageway 34 and a pilot burner passageway 36 in casing 10 when plug 20 is in "on" and "pilot" positions, respectively. Main burner passageway 34 connects passageway 32 to main outlet 14 and pilot burner passageway 36 connects passageway 32 to a passageway 38 communicating with outlet 16. The "on" position of plug 20 is illustrated by FIG. 1 wherein the flow of fuel is from inlet chamber 28 into control passageway 30, lateral passageway 32, main burner passageway 34 to main outlet 14. The "pilot" position of plug 20 is illustrated in FIG. 2 wherein the flow is from lateral passageway 32 into pilot burner passageway 36, passageway 38, to pilot outlet 16 through a pilot filter 39. Further clockwise rotation of plug 20 from the position illustrated in FIG. 2 will position plug 20 in an "off" position wherein no flow is permitted from lateral passageway 32.

A thermoelectric safety valve is provided for shutting off the flow of fuel to both the main and pilot burners in the event of failure of the flame at the pilot burner. To this end, a disc-like safety valve member 42 is positioned in inlet chamber 28 for movement into and out of engagement with valve seat 24 along an axis in alignment with the axis of plug 20. Valve member 42 is secured to one end of a valve stem 44 which has the other end thereof extending into a housing 46 wherein it is operatively connected to an armature of a conventional thermoelectric safety means (not shown). This thermoelectric safety means comprises a thermocouple located in the proximity of the flame at the pilot burner and having the ends thereof connected to a winding carried on the frame of an electromagnet. The armature is engageable with the pole faces of the magnet frame when in its attracted position and is spaced therefrom when in its released position.

It will be understood that the current generated by the thermocouple when heated by the flame of the pilot burner is insufficient to attract the armature from its released position into engagement with the pole faces of the magnet but is sufficient to maintain such relation when the armature has been placed in an attracted position, Since valve member 42 is operatively connected to the armature, it will be held out of engagement with the valve seat 24 when the armature is attracted into engagement with the pole faces, thereby permitting a flow of fuel to the main and pilot burner. A spring 48 is mounted in compression between housing 46 and valve member 42 and thus serves to bias valve member 42 toward engagement with valve seat 24. Thus, the armature is biased towards its released position. As thermoelectric safety devices of this described type are well known in the art, further description is deemed unnecessary.

Manually operable means are provided for resetting the armature from its released position to its attracted position and hence the thermoelectric safety valve from a "closed" position to an "open" position. To this end, a magnet reset stem 50 is mounted in a guide 52 formed in plug 20 for slidable movement along the longitudinal axis of valve member 42. The innermost end 54 of reset stem 50 extends into central passageway 30 for movement into engagement with an abutment member 56 secured to the innermost end of valve stem 44. The outermost end 58 of reset stem 50 is threaded into a control dial 60 which, by means of central ribs 61, is keyed to a cylindrical end portion 62 of plug 20. Dial 60 rotates conjointly with plug 20 and is slidable axially thereof in key slots 64 in cylindrical end portion 62.

A flange 66, formed on reset stem 50, cooperates with the innermost wall 68 of guide 52 to prevent ejection of reset stem 50 from guide 52 by a spring 70 mounted in compression between dial 60 and a sealing means 72 mounted on the outermost wall 74 of guide 52. Spring 70 normally maintains flange 66 in engagement with innermost wall 68 and dial 60 in a tight upward position. A gas cock spring 76, which is mounted in compression between a cup-shaped cover 78 secured to casing 10 by screws 79 and a washer 80 seated on the outer ledge 82 of plug 20, provides a sealing pressure to plug 20 by biasing the same into engagement with conical bore 22.

It will be apparent that movement of control dial 60 toward housing 46 will cause movement of the thermoelectric valve means to the "open" position by engagement of reset stem 50 with abutment member 56 thereby permitting a flow of fuel for the lighting of the pilot burner. In view of the hazard of conducting this operation when control valve 18 is in the "on" position, it is necessary to provide means which will prevent resetting of the thermoelectric safety valve when control valve 18 is in such position. To this end, an interlocking mechanism is provided between control dial 60 and plug 20. Control dial 60 has a pair of diametrically opposed ribs 84 extending radially inwardly so as to overlie the top surface 86 of cover 78. Cover 78 has a pair of diametrically opposed recesses 88 which permit depression of control dial 60 without interference of dial ribs 84 with cover 78. Recesses 88 are circumferentially positioned in cover 78 so as to permit depression of control dial 60 for magnet reset purposes only when control valve 18 has been placed in either the "pilot" or the "off" position by control dial 60. An attempt to depress control dial 60 when control valve 18 is in the "on" position would cause dial ribs 84 to engage top surface 86 of cover 78.

The interlocking mechanism includes means for readily placing control valve 18 in the "pilot" position. To this end, an annular index plate 90 is mounted around cylindrical portion 62 and is biased upwardly into engagement with cover 78 by a spring 89 mounted in compression between the underside of index plate 90 and washer 80. Index plate 90 has a pair of inwardly projecting tangs 92 extending into key slots 64 in cylindrical portion 62 whereby index plate 90 will rotate conjointly with plug 20. Index plate 90 also has an outwardly projecting tang 94 which engages a wall stop 96 formed on cover 78 when plug 20 is rotated clockwise into the "pilot" position. Wall stop 96 is undercut, as shown at 98, whereby when plug 20 is in the "pilot" position, depression of control dial 60 to a suitable depth will permit further clockwise rotation to the "off" position with no interference of wall stop 96 with tang 94 of index plate 90.

In turning control dial 60 from the "off" position counterclockwise to the "on" position, outwardly projecting tang 94 would slide on the undercut portion of wall stop 96 until the control dial 60 has reached the "pilot" position at which time index plate 90 slides off the undercut portion of wall stop 96 and snaps against cover 78 under the action of spring 89. This produces an audible snap whereby the operator is made audibly and visibly aware that dial 60 is in the "pilot" position.

As is customary in these devices, a pointer 99 is provided in cover 78 for alignment with the "on," "pilot," and "off" markings on control dial 60. A square recess 100 is provided in control dial 60 and is adapted to receive an extension shaft for remote operation of the control valve.

In operation, when the pilot burner is lighted, the heat thereof produces a thermoelectric current in the coil of the electromagnet of the thermoelectric safety means. The electromagnet produces an electromagnetic field of sufficient strength so that when the armature of the thermoelectric safety means is placed in an attracted position by the depression of the control dial 60, the magnetic attraction holds the armature in its attracted position thereby maintaining the thermoelectric safety valve in the "open" position. If the pilot flame should be extinguished for any reason, during the normal operation of the burner with the control valve in the "on" position, the holding action of the electromagnet will be insufficient to hold the armature in its attracted position and spring 48 will actuate safety valve member 42 into engagement with valve seat 24 to shut off a supply of fuel to the main and pilot burners.

When it is desired to reset the safety valve so as to permit the flow of fuel through control valve 18, control dial 60 is rotated to the pilot position illustrated in FIG. 2. This places ribs 84 in a position overlying recesses 88 so that control dial 60 may be depressed to reset the armature to its attracted position under the action of magnet reset stem 50. The "pilot" position of the plug 20 permits a supply of fuel to the pilot burner only as is illustrated in FIG. 2.

When the control dial 60 is depressed during the resetting operation, reset stem 50 engages abutment member 56 and moves valve member 42 away from valve seat 24 so that a flow of fuel passes to the pilot burner where it is lighted. This sets up a thermoelectric current to hold the armature in its attracted position thereby maintaining the safety valve in the "open" position. When control dial 60 is released, springs 70 and 89 return the same to its outwardly projecting position as shown in FIG. 1. Control dial 60 may now be rotated counterclockwise to place the plug 20 in the "on" position in which lateral passageway 32 registers with passageway 34 permitting the supply of fuel to the main burner as was previously described, whereby it is ignited by the pilot flame.

If it is desired to shut off the supply of fuel to the main and pilot burners at this point, the control dial 60 is rotated clockwise until tang 94 of index plate 90 engages wall stop 96. Then control dial 60 is depressed by an amount sufficient to permit unobstructed further clockwise movement to the "off" position in which plug 20 has shut off any flow of fuel through both the main burner passageway 34 and the pilot burner passageway 36.

It is to be understood that although only one embodiment of the invention has been shown and described, the invention can be variously embodied and changes may be made in the construction and arrangement of parts without departing from the scope of the invention as defined by the appended claims.

We claim:
1. A fluid flow control valve comprising a casing having inlet and outlet passages intersected by a valve seat, a valve member rotatable on said seat and having a port cooperable with said passages for establishing an on and an off position, said casing having an auxiliary passage cooperable with said port to establish a pilot position separate from said on and off positions, a stem projecting from said valve member and having a driving connection formed thereon, a cover member carried by said casing and apertured to receive said stem, a dial member for positioning said valve member having a driving connection cooperable with said stem driving connection for axial but relatively non-rotatable movement on said stem, an index member operatively engaging said dial and having a driving connection cooperable with said stem driving connection for axial but relatively non-rotatable movement on said stem, said index and cover members having interengaging surfaces operable to restrain rotation of said valve member from said pilot position to said off position, and biasing means for said interengaging surfaces and being yieldable upon axial movement of said index member for freeing said valve member for rotation from said pilot position.

2. A fluid flow control valve comprising a casing having inlet and outlet passages intersected by a valve seat, a valve member rotatable on said seat and having a port cooperable with said passages for establishing an on and an off position, said casing having an auxiliary passage cooperble with said port to establish a pilot position separate from said on and off positions, a stem projecting from said valve member and having a driving connection formed thereon, a cover member carried by said casing and apertured to receive said stem, a dial member having a driving connection cooperable with said stem driving connection for axial but relatively non-rotatable movement on said stem, an index member operatively engaging said dial and having a driving connection cooperable with said stem driving connection for axial but relatively non-rotatable movement on said stem, said index and cover members having interengaging surfaces operable to restrain rotation of said valve member from said pilot position to said off position, biasing means for said interengaging surfaces and being yieldable upon axial movement of said index member for freeing said valve member for rotation from said pilot position, and means for securing said dial and valve members together including means yieldable upon said axial movement of said dial member.

3. A fluid flow control valve comprising a casing having inlet and outlet passages intersected by a valve seat, a valve member rotatable on said seat and having a port cooperable with said passages for establishing an on and an off position, said casing having an auxiliary passage cooperable with said port to establish a pilot position separate from said on and off positions, a hollow stem projecting from said valve member and having oppositely disposed driving connections formed thereon, a cover member carried by said casing and apertured to receive said stem, a dial member having an axial projection guided on said stem and having oppositely disposed driving connections cooperable with said stem driving connections for axial but relatively non-rotatable movement on said stem, an index plate member operatively engaging said dial projection and having at least one driving connection cooperable with one of said stem driving connections for axial but relatively non-rotatable movement on said stem, said plate and cover members having interengaging surfaces operable to restrain rotation of said valve member from said pilot position to said off position, and biasing means for said interengaging surfaces and being yieldable upon axial movement of said plate member for freeing said valve member for rotation from said pilot position.

4. A fluid flow control valve comprising a casing having inlet and outlet passages intersected by a valve seat, a valve member rotatable on said seat and having a port cooperable with said passages for establishing an on and an off position, said casing having an auxiliary passage cooperable with said port to establish a pilot position separate from said on and off positions, a stem projecting from said valve member and having a driving connection formed thereon, a cover member carried by said casing and apertured to receive said stem, a dial member overlying said cover member and having a driving connection cooperable with said stem driving connection for axial but relatively non-rotatable movement on said stem, an index plate member operatively engaging said dial and having a driving connection cooperable with said stem driving connection for axial but relatively non-rotatable movement on said stem, said plate and cover members having interengaging surfaces operable to restrain rotation of said valve member from said pilot position to said off position, biasing means for said interengaging surfaces and being yieldable upon axial movement of said plate member for freeing said valve member for rotation from said pilot position, abutment means operable between said dial and cover members for preventing said axial movement of said dial member in said on position of said valve member, and means for securing said dial and valve members together including means yieldable upon said axial movement of said dial member.

5. A fluid flow control valve comprising a casing having inlet and outlet passages intersected by a valve seat, a valve member rotatable on said seat and having a port cooperable with said passages for establishing an on and an off position, said casing having an auxiliary passage cooperable with said port to establish a pilot position separate from said on and off positions, a hollow stem projecting from said valve member and having oppositely disposed driving connections formed thereon, a cover member carried by said casing in spaced overlying relation to said valve member and apertured to receive said stem, a dial member having an axial projection telescopically mounted on said stem and defining an abutment, said dial member having a driving connection cooperable with said stem driving connection for axial but relatively non-rotatable movement on said stem, an index plate member operatively engaging said abutment and having at least one driving connection cooperable with one of said stem driving connections for axial but relatively non-rotatable movement on said stem, said plate and cover members having interengaging surfaces operable to restrain rotation of said valve member from said pilot position to said off position, coil spring means positioned on said stem between said valve member and said plate member, said spring means being yieldable upon axial movement of said plate member for freeing said valve member for rotation from said pilot position, and means for securing said dial and valve members together including second coil spring means yieldable upon said axial movement of said dial member.

6. A fluid flow control valve comprising a casing having inlet and outlet passages intersected by a valve seat, a valve member rotatable on said seat and having a port cooperable with said passages for establishing an on and an off position, said casing having an auxiliary passage cooperable with said port to establish a pilot position separate from said on and off positions, a hollow stem projecting from said valve member and having oppositely disposed driving connections formed thereon, a cover member carried by said casing in spaced overlying relation to said valve member and apertured to receive said stem, a dial member overlying said cover member having an axial projection telescopically mounted on said stem and defining an abutment, said dial member having a driving connection cooperable with said stem driving connection for axial but relatively non-rotatable movement on said stem, an index plate member operatively engaging said abutment and having at least one driving connection cooperable with one of said stem driving connections for axial but relatively non-rotatable movement on said stem, said plate and cover members having interengaging surfaces operable to restrain rotation of said valve member from said pilot position to said off position, coil spring means positioned on said stem between said valve member and said plate member, said spring means being yieldable upon axial movement of said plate member for freeing said valve member for rotation from said pilot position, abutment means operable between said dial and cover members for preventing said axial movement of said dial member in said on position of said valve member, and means for securing said dial and valve members together including means yieldable upon said axial movement of said dial member.

References Cited in the file of this patent

UNITED STATES PATENTS

| | | |
|---|---|---|
| 2,213,844 | Mantz | Sept. 3, 1940 |
| 2,318,823 | Wantz | May 11, 1943 |
| 2,422,368 | Ray | June 17, 1947 |
| 2,477,078 | Mueller | July 26, 1949 |
| 2,588,179 | Thornbery | Mar. 4, 1952 |
| 2,597,874 | Koch | May 27, 1952 |
| 2,652,226 | Huff | Sept. 15, 1953 |
| 2,735,439 | Coffey | Feb. 21, 1956 |
| 2,746,472 | Sogge | May 22, 1956 |
| 2,850,032 | Coffey | Sept. 2, 1958 |
| 2,881,779 | Meusy | Apr. 14, 1959 |